United States Patent [19]

Rumberger et al.

[11] 4,297,778
[45] Nov. 3, 1981

[54] METHOD AND APPARATUS FOR REMOVING LINERS FROM METAL CLOSURES

[75] Inventors: Earl E. Rumberger, Pittsburgh, Pa.; Frank M. Kelly, Richmond, Ind.

[73] Assignee: Aluminum Company of America, Pittsburgh, Pa.

[21] Appl. No.: 144,342

[22] Filed: Apr. 28, 1980

[51] Int. Cl.³ .................. B23P 19/04; B21D 22/20
[52] U.S. Cl. .................. 29/426.4; 29/426.5; 29/239; 29/403.3; 113/121 F; 156/344; 156/584; 72/347
[58] Field of Search .................. 29/426.5, 426.1, 403.1, 29/403.3, 403.4, 235, 239, 283.5, 426.4, 234; 81/3.2, 3 R; 72/347; 113/121 F, 1 D, 1 R, 1 F, 80 DA, 80 D; 156/344, 384

[56] References Cited

U.S. PATENT DOCUMENTS

| | | | |
|---|---|---|---|
| 1,190,384 | 7/1916 | Court | 113/1 D |
| 1,276,267 | 8/1918 | Rasmussen et al. | 113/121 F |
| 1,649,841 | 11/1927 | May | 72/347 |
| 3,364,556 | 1/1968 | Cocce et al. | 29/239 |
| 3,475,944 | 11/1969 | Marshner | 72/347 |
| 3,618,429 | 11/1971 | Froeliger | 81/3.2 |

Primary Examiner—Milton S. Mehr
Attorney, Agent, or Firm—Max L. Williamson

[57] ABSTRACT

A method and apparatus for separating a liner from a formed metal closure by at least partially everting the closure so as to make the liner accessible for separation from the closure.

16 Claims, 8 Drawing Figures

METHOD AND APPARATUS FOR REMOVING LINERS FROM METAL CLOSURES

BACKGROUND OF THE INVENTION

This invention relates to a method and apparatus for removing liners from metal closures.

Metal closures having plastic liners contained therein have become increasingly popular for sealing and containing a product in a container, particularly soft drinks and beer. Typically, the closure is made of aluminum and is adapted to threadably engage with a bottle. The liner, typically, is made of a plastic material such as polyvinyl chloride or ethylene vinyl acetate.

In the manufacture of such closures a certain amount of closures are manufactured that are defective for one reason or another and thus become scrap. With the relatively recent emphasis on recycling of aluminum scrap, these defective closures have become a potentially valuable source for recoverable and recyclable aluminum scrap.

An even greater potential source for recoverable and recyclable aluminum scrap is the used closure removed from the bottle by the consumer. In order to reduce litter, a number of states have enacted legislation which requires a deposit on the container at the time of purchase whether the container is reusable or not. At least one state has carried this concept further by requiring that the closure be returned with the container for refund of the deposit. Even in those states that do not require return of the closure, it has been observed that many consumers return the closure with the empty container.

Typically, the liner is firmly affixed to the closure by an adhesive or by partially melting a portion of the liner adjacent the end wall of the closure, thus making it difficult to remove the liner. This has a severe adverse effect upon the value of the closure as recyclable scrap because the weight of the liner is approximately 33% of the total weight of the closure and thus it creates a substantial contamination problem when remelting the combination. The difference in value in today's scrap market, for example, is approximately $0.18/# for closures having the liners contained therein as opposed to approximately $0.48/# if the liners were removed.

Since a goodly number of containers are now being returned by the consumer to recover a deposit and since many of those containers are returned with the used closure attached thereto, the closure must be removed if the container is of a reusable variety. A wide variety of devices have been developed to remove closures from bottles, such as U.S. Pat. No. 3,803,795, for example, but because of the relatively low scrap value of a closure having a liner contained therein, the closures are often simply discarded.

Heretofore attempts have been made to remove the liners by burning or dissolving them in a chemical solvent to take advantage of the enhanced scrap value, but such methods have not been practically or commercially feasible. As a consequence, bottlers or others concerned with disposing of the scrap closures have not been economically motivated to introduce the scrap closures into the recyclable metal stream, and a potentially valuable asset is being lost.

It is desirable, therefore, to provide a method and apparatus for economically removing a plastic liner from a scrap metal closure to enhance the value of the closure and encourage the recovery of a valuable recyclable metal asset.

BRIEF DESCRIPTION OF THE INVENTION

It is an object of this invention to provide a method and apparatus for removing a liner from a metal closure.

In accordance with this invention, a closure having a liner therein is positioned and supported over a circular opening in a closure supporting element. A punch, coaxially aligned with and positioned above the opening and the closure, has a diameter somewhat less than the inside diameter of the skirt wall cylinder of the closure. On the downstroke of the punch, the punch applies pressure to the end wall of the closure and at least partially everts the closure as the punch travels through the opening. After advancing the punch a distance sufficient to make the liner accessible, the liner is separated from the punch by a mechanical means and the closure is subsequently cleared from the punch. A heating element may be provided within the punch to soften the bond between the linear and the end wall if desired.

This and other objects and advantages will become more apparent from the description and examination of appended drawings in conjunction therewith of a preferred embodiment of the present invention.

DESCRIPTION OF A PREFERRED EMBODIMENT OF THE INVENTION

Figure 1:
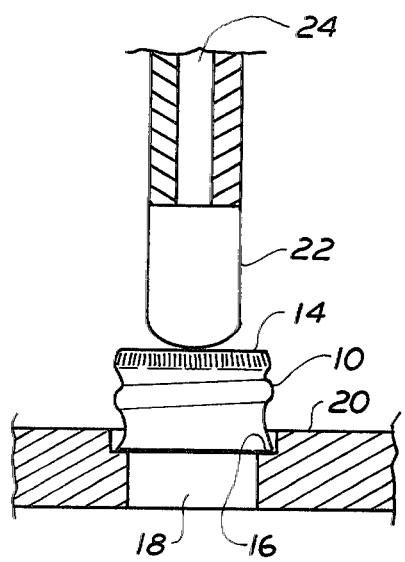
FIG. 1 is an elevation view with a partial cross section of the punch, cross section of the die, and a metal closure mounted on the die at the beginning of the delining cycle.

Referring now to the drawings, a metal threaded closure 10 having a plastic liner 12 attached to the end wall 14 is positioned with its open end edge resting on an annular ledge 16 adjacent a circular opening 18 in a die 20.

At the beginning of the delining cycle a cylindrical punch 22 adapted for reciprocal motion is positioned against the end wall 14 of closure 10 as shown in FIG. 1 with its longitudinal axis in coaxial alignment with the axis of the circular die opening 18. The punch 22 is of a smaller diameter than the inside diameter of the closure 10 to prevent the closure 10 from binding on the punch 22 as the closure is everted, as will be explained later.

Figure 2:
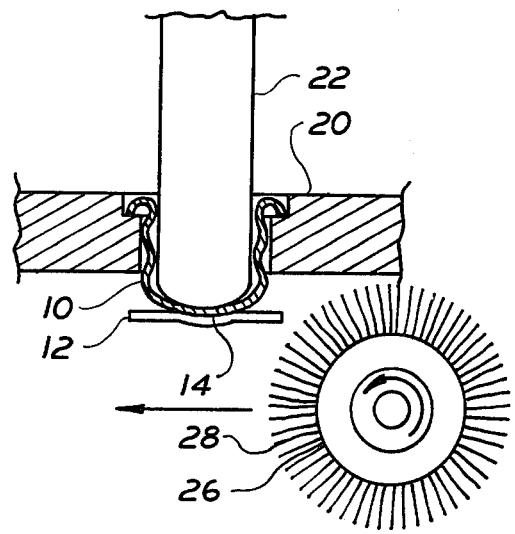
FIG. 2 is an elevation drawing of the elements shown in FIG. 1 and a rotating wire brush at the point in the downstroke when the liner is positioned for removal.

From the position shown in FIG. 1, the punch 22 is caused to move downward until the closure 10 and punch 22 are in relationship with die member 20 as shown in FIG. 2. The closure 10 is reverse drawn or everted as shown in FIG. 2 by the force of the downward moving punch 22 pushing against the end wall 14 as the punch 22 moves through the opening 18 of the die member 20. A heating element 24 may be provided, if desired, extending longitudinally along the axis of punch 22 to transmit heat through the end wall 14 to soften the liner 12 at the interface between the liner 12 and the end wall 14. As shown in FIG. 2, the end wall 14 and liner 12 are approximately 3/16 inch below the bottom surface of die member 20.

A rotating wire brush 26 adapted to move horizontally as indicated by the horizontal directional arrow in FIG. 2 engages the extending edge of the liner 12 and the action of the rotating wire elements 28 against the liner 12 causes it to separate from the closure 10 and fall free.

Figure 3:
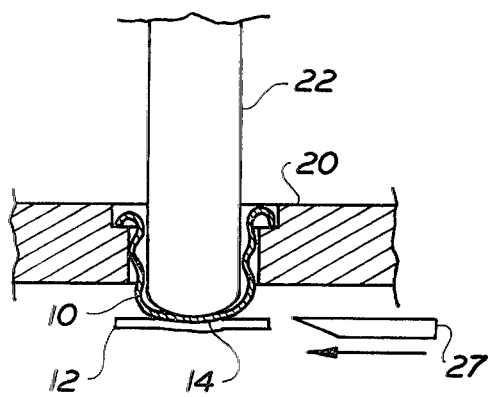
FIG. 3 is an elevation drawing of the elements shown in FIG. 1 and a chisel as an alternate embodiment of the wire brush shown in FIG. 2.

An alternative means for stripping the liner 12 from the end wall 14 is shown in FIG. 3. An elongated chisel or scraper 27 having a beveled leading edge is adapted to move laterally in the direction of the arrow so as to sever the bond between the liner 12 and end wall 14.

Figure 4:
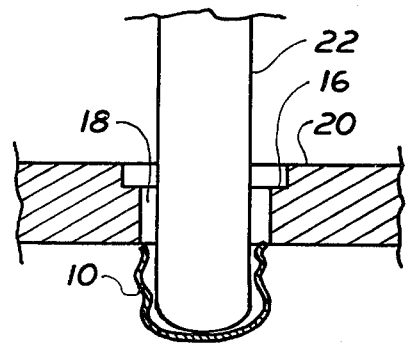
FIG. 4 is an elevation drawing of the elements in FIG. 1 at the end of the downstroke of the punch.
Figure 5:
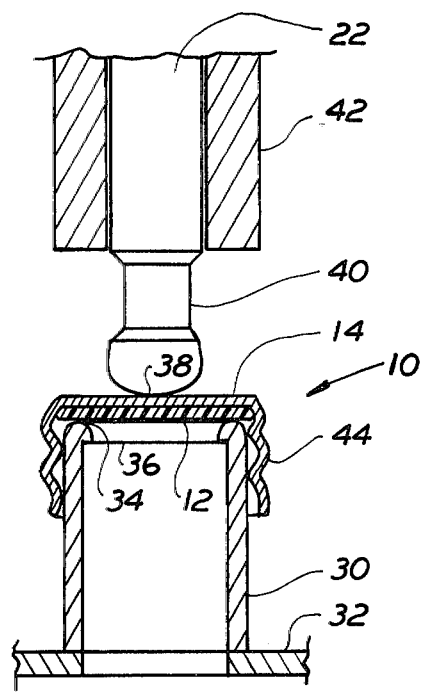
FIG. 5 is an elevation view of an alternate embodiment of this invention, showing a closure having a liner contained therein positioned for the beginning of the delining cycle.

The rotating wire brush 26 or chisel 27 is then retracted to its original position, and punch 22 is activated to continue its downstroke until closure 10 clears the die 20 as shown in FIG. 4. At this point, the closure 10 falls free from the punch 22 because the diameter of the punch is limited to that which will prevent binding of the closure thereon.

It is apparent that whether a rotating wire brush 26 or chisel 27 be employed to break the bond between the liner 12 at the interface of the end wall 14, the separation can be effected by moving the liner 12 and closure 14 assembly past the brush 26 or chisel 27 rather than vice versa as just described.

Alternative apparatus for removing a liner from a closure falling within the scope of this invention is shown in FIGS. 5, 6, 7 and 8. The alternative apparatus is the subject of a U.S. patent application Ser. No. 143,743, entitled "Method and Apparatus for Everting a Closure and Separating a Liner Therefrom" filed by W. C. Willis concurrently herewith. A hollow cylindrical tube 30 is vertically supported on a platform 32. The tube has a curved top edge 34 and an inwardly projecting annular lip 36 adjacent the top edge 34. An elongate cylindrical punch 22 is coaxially aligned with the tube 30 and is adapted for axial reciprocal motion. The punch 22 is provided with a curved end surface 38 and an annular recess 40 adjacent the curved end 38. A hollow cylindrical stripper 42 is coaxially aligned with the punch 22, and the punch 22 is at least partially contained within the center bore of the stripper 42. Sufficient clearance between the punch 22 and the inner surface of the stripper 42 is provided for reciprocal motion of the punch 22 in relation thereto.

At the beginning of the delining cycle, a closure 10 is positioned on the tube 30 with the end wall 14 and liner 12 affixed thereto supported by the curved upper edge 34 of the tube 30 and the depending skirt wall 44 of the closure 10 loosely surrounding the tube 30.

Advancing the punch 22 downward against the end wall 14 causes the end wall 14 and liner 12 to distort and draw the skirt wall 44 of the closure 10 over the curved top edge 34 of tube 30. As advancement of the punch 22 continues, wall portions of the closure wrap around the end of the punch 22 and partially grip at least a portion of the reduced diameter punch in the recess 40.

Figure 6:
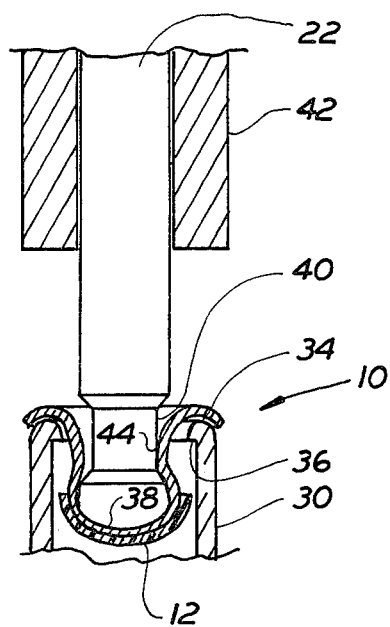
FIG. 6 is a partial view of the elements shown in FIG. 5 with the closure partially everted and the liner accessible for separation from the closure.

As shown in FIG. 6, the punch 22 having the closure 10 coupled therewith has advanced a distance at least sufficient for the edge of the liner 12 to clear the inwardly extending lip 36 of the tube 30.

Figure 7:
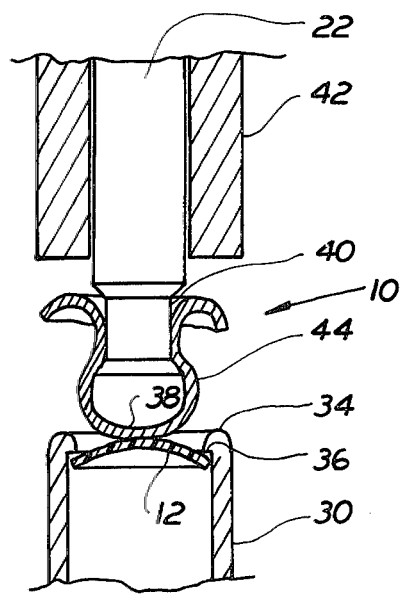
FIG. 7 is a partial view of the elements shown in FIG. 5 with the liner restrained for separation.

The motion of the punch 22 is then reversed, and as the punch 22 is withdrawn from the tube 30, an edge portion of the liner 12 contacts the tube lip 36 and restrains it from being withdrawn from the tube 30, as shown in FIG. 7.

Figure 8:
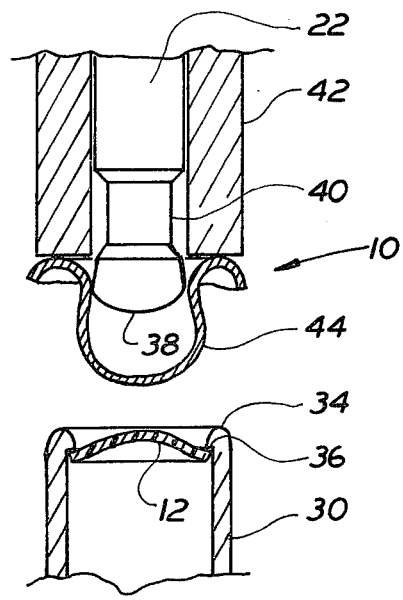
FIG. 8 is a partial view of the elements shown in FIG. 5 with the liner separated and the closure at the point of being stripped from the punch.

In the view shown in FIG. 8, the liner 12 has been separated from the closure 10 because of the restraint provided by the tube lip 36, and the punch 22 with the closure 10 coupled therewith has been withdrawn free of the tube 30. The punch 22 has been withdrawn a distance sufficient to cause the stripper 42 to contact the closure 10 which is shown at the point of detachment with the punch 22. It is apparent that further withdrawal of the punch 22 will cause the closure 10 to be stripped from the punch 22 and fall free for collection.

Thus, it can be seen that the present invention provides a novel and economical method of removing a plastic liner from a metal closure which encourages recovery of a valuable asset that is now being lost as waste.

What is claimed is:

1. A method of separating a liner from a metal closure having a cylindrical skirt and a top end wall having an exterior surface and an interior surface against which a liner is disposed, comprising:
   supporting the closure;
   pressing against a central portion of the outer surface of the closure end wall and at least partially everting said closure to make said liner accessible for separation; and
   separating said liner from the everted closure.

2. A method as described in claim 1 which includes at least partially melting the liner at the interface between the liner and the closure.

3. A method as described in claim 1 in which the skirt of the closure has an annular terminal edge which is supported during said pressing operation.

4. A method as described in claim 1 which includes peeling a liner from an everted closure having the liner bonded thereto.

5. Apparatus for separating a liner from a metal closure having a cylindrical skirt and a top end wall having an exterior surface and an interior surface against which a liner is disposed, comprising:
   a support means for supporting a metal closure so that the closure may be at least partially everted;
   a pressing means disposed above said support means for pressing against a central portion of the outer surface of the closure end wall while the closure is supported on said support means; and
   a separating means disposed below said support means for separating the liner from the closure.

6. Apparatus as described in claim 5 which includes a heating means contained within said pressing means for at least partially melting the liner at the interface of the liner and the closure.

7. Apparatus as described in claim 5 wherein said separating means is a wire brush.

8. Apparatus as described in claim 5 wherein said separating means is a chisel.

9. Apparatus as described in claim 5 wherein said pressing means is a punch.

10. Apparatus as described in claim 5 wherein said support means is a die having a circular opening therein.

11. Apparatus as described in claim 10 wherein said die includes an annular ledge adjacent the opening.

12. Apparatus for separating a liner from a metal closure having a cylindrical skirt and a top end wall having an exterior surface and an interior surface against which a liner is disposed, comprising:

a die having a circular opening therein;

a punch, coaxially aligned with the die opening, disposed above said die and the closure supported and retained thereon; and a separating means disposed below said die and adjacent to the opening for separating the liner from the closure.

13. Apparatus as described in claim 12 which includes a heating means within said punch for at least partially melting the liner at the interface of the liner and the closure.

14. Apparatus as described in claim 12 which includes an annular ledge adjacent the opening in said die.

15. Apparatus as described in claim 12 wherein said separating means is a wire brush.

16. Apparatus as described in claim 12 wherein said separating means is a chisel.

* * * * *